United States Patent [19]

Fusaro, Jr. et al.

[11] Patent Number: 5,961,856
[45] Date of Patent: Oct. 5, 1999

[54] DEEP WATER POWDER FEED HOPPER

[75] Inventors: Robert Anthony Fusaro, Jr., Cobleskill; Raymond Alan White, Schenectady, both of N.Y.

[73] Assignee: General Electric Company, Schenectady, N.Y.

[21] Appl. No.: 09/119,069

[22] Filed: Jul. 10, 1998

[51] Int. Cl.⁶ .................................................. B23K 10/00
[52] U.S. Cl. ................ 219/121.47; 219/121.45; 219/121.48; 239/85; 118/308
[58] Field of Search .................. 219/121.47, 121.45, 219/76.15, 76.16, 121.48; 427/28, 181, 236–240; 118/312, 622, 308; 239/11, 85

[56] References Cited

U.S. PATENT DOCUMENTS

| | | | |
|---|---|---|---|
| 3,839,077 | 10/1974 | Robinson | 117/100 R |
| 4,987,001 | 1/1991 | Knobbe et al. | 427/28 |
| 5,690,844 | 11/1997 | White et al. | 219/121.47 |

*Primary Examiner*—Mark Paschall
*Attorney, Agent, or Firm*—Norren C. Johnson; Douglas E. Stoner

[57] ABSTRACT

A hopper feeds powder underwater to a welding torch. The hopper includes a housing having a lower chamber and an integral upper chamber. An inlet joins the upper chamber for receiving powder and a pressurized carrier gas. A powder outlet joins the lower chamber for discharging the powder to the torch. A gas outlet joins the upper chamber for releasing the carrier gas. And, a control valve joins the gas outlet for selectively controlling pressure internal the housing.

9 Claims, 2 Drawing Sheets

DEEP WATER POWDER FEED HOPPER

BACKGROUND OF THE INVENTION

The present invention relates generally to plasma arc welding, and, more specifically, to plasma arc welding or cladding underwater using a metal filler powder.

In one type of underwater welding, a filler metal in the form of a powder must be suitably delivered dry to a welding torch for welding or cladding a metal workpiece underwater. In one welding technique being developed, an Underwater Plasma Transferred Arc (UPTA) is used for cladding certain components of a Boiling Water Reactor (BWR) for enhancing the strength thereof.

In plasma arc welding, an electrical arc is formed in the presence of an ionizing gas to form a hot plasma which is used to melt the surface of the workpiece and upon which a filler powder is clad. A typical plasma torch includes a center electrode in a housing defining a second electrode between which the arc is formed. The ionizing gas is channeled through the torch and out a central nozzle orifice surrounding the center electrode's tip for forming the plasma. In a plasma transferred arc torch, the workpiece itself defines the second electrode, or ground, instead of the torch housing, and the arc is formed between the electrode and the workpiece. In either embodiment, the plasma generates sufficient heat for locally melting the workpiece and filler powder for cladding the workpiece.

The cladding process may be effected underwater by temporarily excluding or removing water from the immediate vicinity of the plasma arc so that the powder may be melted atop the developed melt pool which is quench cooled as the torch is carried along a welding path.

The water is temporarily excluded from the vicinity of the plasma torch by introducing a pressurized shielding gas inside a surrounding skirt for displacing the water therefrom. The pressure of the shielding gas must be suitably higher than the hydrostatic pressure of the water at the particular depth for expelling the water from the skirt surrounding the torch nozzle. Correspondingly, the filler powder is delivered to the torch using a suitable carrier gas which also must be at a suitably high pressure and flowrate for overcoming the hydrostatic pressure of the water at the specific depth.

In a typical plasma torch, a pair of diametrically opposite powder injection ports straddle the nozzle orifice from which the plasma arc is generated. The powder ports are simply tubular conduits extending through the nozzle and discharge radially outwardly of the nozzle orifice. As the depth underwater of the workpiece is increased, the hydrostatic pressure increases which in turn requires an increase in the pressure of the powder carrier gas which adversely affects the plasma and welding process as the powder is ejected. Testing has shown that high flow carrier gas causes the plasma arc to distort into two portions, which in turn results in formation of a double bead weld. This prevents the formation of a uniform weld or cladding layer and is therefore undesirable.

In U.S. Pat. No. 5,690,844, assigned to the present assignee, this problem has been addressed and significantly alleviated using a remote torch feed hopper in which the powder is delivered with a high flow and high pressure carrier gas, with the gas being vented prior to final delivery of the powder to the nozzle. In this way, the powder may be carried to substantial depths underwater and vented to minimize adverse affect when injected into plasma arc.

However, the vented carrier gas may entrain some of the powder for which additional components such as a powder collector, water vapor filter, and flowmeter are provided. Furthermore, performance of the remote hopper varies as the hydrostatic water pressure varies.

Accordingly, it is desired to provide an improved plasma torch feed hopper having fewer components and operable at variable hydrostatic pressure.

SUMMARY OF THE INVENTION

A hopper feeds powder underwater to a welding torch. The hopper includes a housing having a lower chamber and an integral upper chamber. An inlet joins the upper chamber for receiving powder and a pressurized carrier gas. A powder outlet joins the lower chamber for discharging the powder to the torch. A gas outlet joins the upper chamber for releasing the carrier gas. And, a control valve joins the gas outlet for selectively controlling pressure internal the housing.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
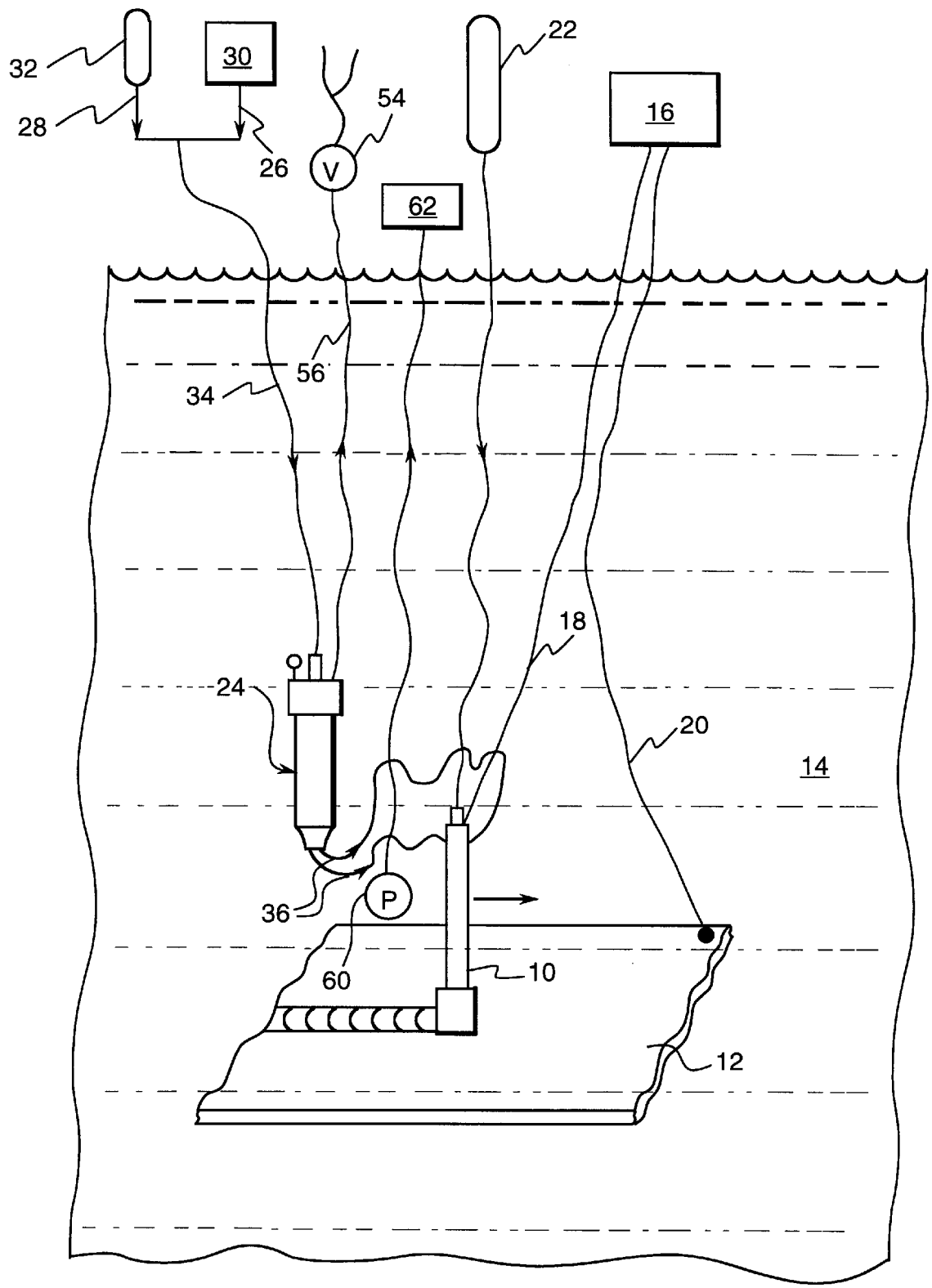
FIG. 1 is a schematic, elevational view of an underwater plasma torch and feed hopper therefor in accordance with an exemplary embodiment of the present invention.

Illustrated schematically in FIG. 1 is an Underwater Plasma Transferred Arc (UPTA) torch 10 for welding or cladding a metallic workpiece 12 at depth under water 14. The workpiece 12 may be any of various internal components in a BWR nuclear reactor for which cladding thereof is desired, although the invention may be used for other applications as well. The depth of the welded workpiece may therefore vary from just below the water surface to about 100 meters or more therebelow.

The plasma torch 10 is disposed in a system including an electrical power system 16 having a first electrical lead 18 joined to the torch, and a second electrical lead 20 joined to the workpiece for providing an electrical ground. A first gas supply 22 is joined in flow communication with the torch using a flexible conduit for supplying an inert gas, such as Argon, for use in developing the plasma and providing a suitable shielding gas therearound.

A remote torch feed hopper 24 in accordance with the present invention is disposed underwater adjacent the torch 10 and receives metallic filler powder 26 and a carrier gas 28 therefor, such as Argon. A powder supply 30 and a carrier gas supply 32 are located above the water and are joined to the hopper 24 using a flexible conduit 34.

The carrier gas is provided under high pressure and high flowrate for carrying the powder 26 to the hopper 24 at the desired depth underwater for overcoming the hydrostatic pressure thereof. For the BWR example, the torch 10 and hopper 24 may be disposed underwater at a depth of up to about 24 meters having a hydrostatic pressure to about 2.5 atmospheres. The pressure of the carrier gas 28 is suitably higher than the hydrostatic pressure for not only overcoming that pressure but also overcoming pressure losses through the delivery conduit 34 and associated fittings.

A pair of feed conduits 36 join the hopper 24 to the torch 10 for delivering the powder 26 thereto using residual carrier gas therewith. The torch 10 may take any conventional form such as that disclosed in the patent referenced above. For example, the torch includes a tubular housing the top of which is joined in flow communication with the powder feed conduits 36, and with a corresponding gas delivery conduit from the gas supply 22. The first lead 18 is joined to a central electrode extending through the housing to a nozzle orifice at the bottom thereof. The ionizing gas is discharged through the nozzle around the center electrode and produces a plasma arc during operation.

An annular skirt surrounds the torch nozzle and receives a portion of the supplied gas for locally excluding the water therefrom to permit welding of the workpiece 12 as the torch is traversed therealong. The torch nozzle includes an opposite pair of powder discharge ports joined to the respective feed conduits 36 from which the filler powder 26 is discharged around the plasma arc and melted thereby for cladding atop the workpiece 12.

In order to promote effective operation of the torch 10 without undesirably disturbing the plasma arc during operation, the powder discharged therefrom should not have excessive pressure or flowrate. Accordingly, the torch feed hopper 24 is located remotely from the water surface and adjacent the torch 10 to deliver the powder to the torch 10 with sufficient pressure for overcoming the hydrostatic pressure in the vicinity of the torch, and with a suitable flowrate for achieving a proper weld bead.

Figure 2:
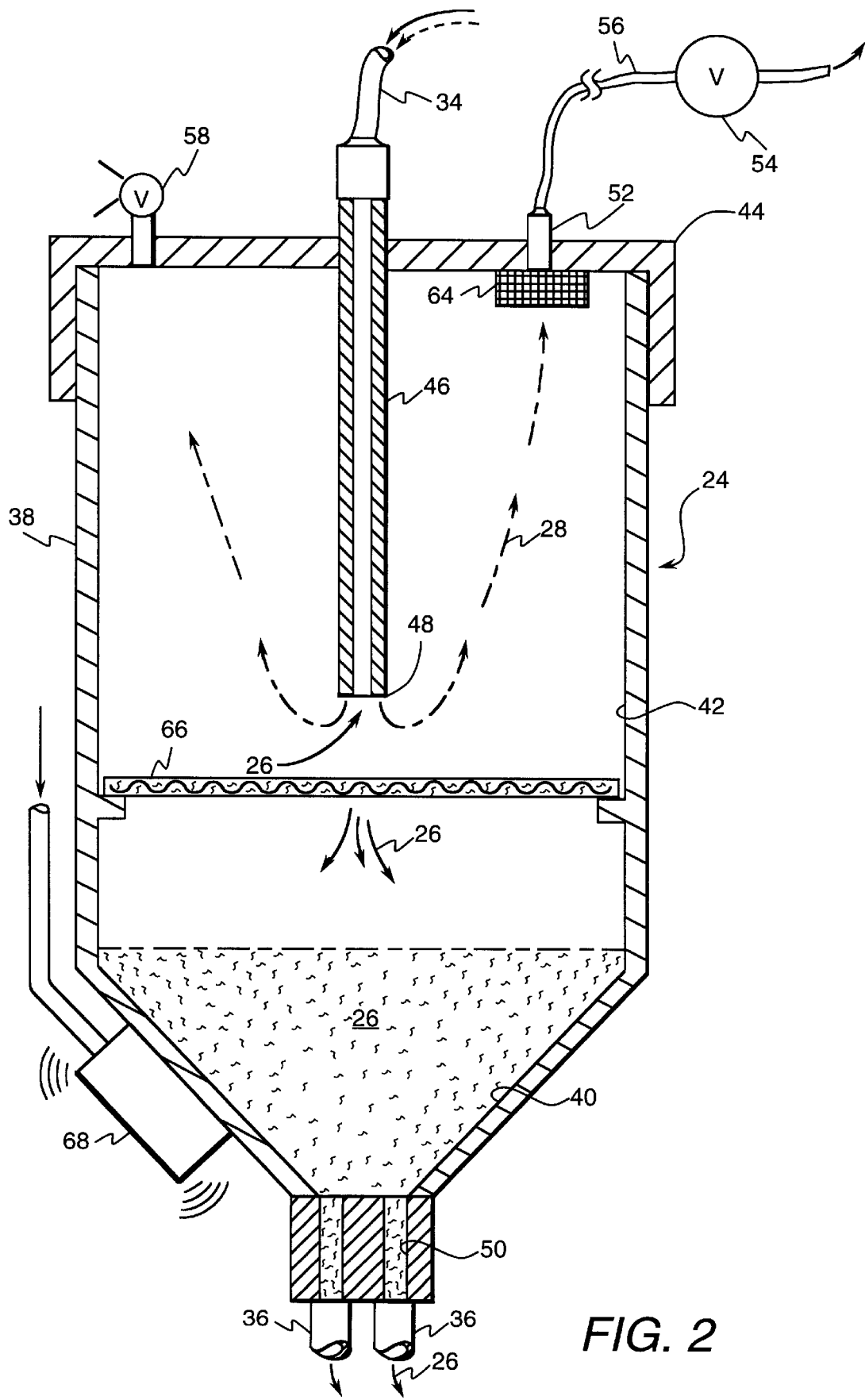
FIG. 2 is an elevational, sectional view through the feed hopper illustrated in FIG. 1 disposed adjacent the plasma torch in accordance with an exemplary embodiment of the present invention.

More specifically, the hopper 24 is illustrated in more detail in FIG. 2 and includes a vertically disposed tubular housing 38 having a funnel shaped lower chamber or bin 40 for receiving and accumulating the powder, and an integral upper chamber 42 disposed vertically thereabove. The housing 38 includes a removable cap 44 which threadingly engages the top of the housing for providing convenient access therein for assembly and maintenance purposes.

An inlet in the form of an elongate tube 46 extends in most part vertically downwardly through the upper chamber 42, and includes a bottom orifice 48 disposed atop the lower chamber 40 for discharging the powder downwardly into the lower chamber. The inlet 46 is joined at its opposite upper end to the feed conduit 34 and is disposed in flow communication with the upper chamber for initially receiving the powder 26 in the pressurized carrier gas 28.

One of more powder outlets 50 are disposed in flow communication with the bottom of the lower chamber 40 for discharging or channeling the powder to the torch 10 through the corresponding feed conduits 36, with two being shown in this example.

A gas outlet 52 is disposed in flow communication with the upper chamber 42 for releasing or venting most of the carrier gas for reducing the pressure inside the housing. An adjustable control valve 54 is disposed in flow communication with the gas outlet 52 through a flexible venting conduit 56 for selectively controlling pressure internal the housing in the two chambers 40, 42 thereof.

As indicated above, the carrier gas 28 must be supplied at a sufficiently high initial pressure for overcoming hydrostatic pressure of the water at the depth of the torch 10 and the pressure losses between the gas supply 32 and the torch nozzle. At 24 meters depth, for example, the carrier gas pressure must be greater than about the 2.5 atmosphere hydrostatic pressure.

In accordance with the present invention, the control valve 54 is used to selectively control the internal pressure of the housing 38 for venting the carrier gas 28 sufficiently for promoting powder feed to the torch 10 without disruption of the plasma arc thereof. In the exemplary embodiment illustrated in FIG. 2, the hopper 24 also includes a pressure relief valve 58 at the top thereof which may take any conventional form for venting excess pressure in the housing above a preselected maximum pressure.

As shown in FIG. 1, means are provided for adjusting the valve 54 in response to hydrostatic pressure external the housing of the hopper 24 as a function of the specific depth underwater in the vicinity of the hopper 24 and the torch 10. In the exemplary embodiment illustrated, the valve adjusting means include a pressure sensor 60 for measuring the hydrostatic pressure outside the hopper 24, and a suitable actuator 62 operatively joined to the valve 54 and sensor 60 for adjusting the valve to vary the internal pressure inside the hopper 24.

In a preferred embodiment, the actuator 62 comprises an electrical controller or processor which receives an electrical pressure signal from the sensor 60 to correspondingly open and close the control valve 54 as required for establishing a desired internal pressure inside the hopper. The desired internal pressure of the hopper may be preselected depending on the depth of the hopper and torch underwater and the pressure losses associated with channeling the powder to the torch.

The valve 54 may therefore be configured in varying amounts of open flow area to vent the carrier gas from the hopper and reduce the internal pressure thereof to slightly greater than about the external pressure around the hopper for effecting primarily gravity feed of the powder to the torch. By sufficiently venting the carrier gas, flow of the powder primarily by gravity, and secondarily by any residual carrier gas pressure, may be used to finally deliver the powder to the torch 10 for discharge around the plasma arc without disturbing its form.

As shown in FIG. 1, the pressure sensor 60 may be a discrete element positionable where desired in the vicinity of the hopper 24 or the torch 10 underwater. The control valve 54 may be located remotely from the welding site and above the water as shown. Alternatively, the control valve 54 and its adjusting means may be mounted directly on the housing of the hopper 24 itself if desired.

The control valve 54 may be configured in an all-mechanical assembly for sensing the differential pressure across the housing wall between the inside and outside thereof for automatically adjusting the valve to vent the carrier gas and achieve a predetermined, fixed differential pressure therebetween. In this way, a constant differential pressure may be maintained between the hopper 24 and the water 14 irrespective of the specific depth underwater.

In the various embodiments disclosed above for the control valve 54, precise venting of the carrier gas may be obtained for maximizing performance of the plasma torch 10 by delivering thereto the powder 26 with only sufficient flowrate and pressure for discharge around the plasma arc without disruption thereof.

In the preferred embodiment illustrated in FIG. 2, the gas outlet 52 is disposed atop the upper chamber 42 and cooperates with the elongate inlet tube 46 for effecting a circuitous flowpath for separating the powder 26 from the carrier gas 28. The powder and carrier gas initially enter the hopper 24 in a downwardly directed jet, with the inertia of the powder ensuring its travel downwardly toward the lower chamber 40 in which it accumulates. The low mass carrier gas 28 must abruptly turn upwardly from the inlet orifice 48 in order to flow through the top mounted gas outlet 52.

The circuitous flowpath for venting the carrier gas 28 promotes powder separation therefrom. And, a porous first screen 64 preferably covers the gas outlet 52 inside the upper chamber 42 for additionally separating the powder from the carrier gas. The screen 64 has suitable porosity for preventing egress of the residual powder 26 from escaping in the exhaust line 56. And, the placement of the screen 64 and gas outlet 52 atop the housing 38 over the empty upper chamber 42 promotes gravity separation of the powder from the screen which falls downwardly by gravity into the lower chamber 40. In this way, the filter, accumulator, and flowmeter found in the prior art system disclosed above may be eliminated.

In the preferred embodiment, a second porous screen 66 is suitably mounted in the housing 38 and separates the lower and upper chambers 40, 42 for sifting the powder discharged from the inlet orifice 48 into the lower chamber.

A suitable air-powered vibrator 68 is preferably attached to the bottom of the housing 38 at the lower chamber 40 for vibrating the housing to promote gravity feed and discharge of the powder through the powder outlets 50. The vibration also promotes gravity separation of residual powder on the two screens 64, 66 for return to the lower chamber 40 and self-cleaning the screens. The vibrator 68 may have any conventional form such as a rotating eccentric weight powered by an integral air turbine using pressurized air channeled thereto through a corresponding air conduit from above the surface of the water.

The powder feed hopper 24 disclosed above provides local accumulation of powder for gravity feed to the plasma torch 10 at a corresponding depth therewith underwater. The control valve 54 allows precise control of the differential pressure inside to outside the hopper irrespective of hopper depth underwater. Powder flow to the torch 10 may now be optimized by suitably adjusting the control valve 54 as a function of the various depth underwater of the plasma torch and the adjoining feed hopper 24.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A hopper for feeding powder underwater to a welding torch comprising:

a housing having a lower chamber for accumulating said powder, and an integral upper chamber;

an inlet disposed in flow communication with said upper chamber for receiving said powder in a pressured carrier gas;

a powder outlet disposed in flow communication with said lower chamber for discharging said powder to said torch;

a gas outlet disposed in flow communication with said upper chamber for releasing said carrier gas; and a valve disposed in flow communication with said gas outlet for selectively controlling pressure internal said housing; and a means for adjusting said valve in response to hydrostatic pressure external said housing.

2. A hopper according to claim 1 wherein said valve adjusting means comprise:

a sensor for measuring said external pressure; and an actuator operatively joined to said valve and sensor for adjusting said valve to vary said internal pressure.

3. A hopper according to claim 2 wherein said actuator comprises an electrical controller.

4. A hopper according to claim 2 wherein said valve is configured to reduce said internal pressure to greater than about said external pressure for effecting gravity feed of said powder to said torch.

5. A hopper according to claim 2 wherein said inlet comprises an elongate tube extending in most part vertically through said upper chamber, with a bottom orifice disposed atop said lower chamber for discharging said powder downward therein.

6. A hopper according to claim 5 wherein said gas outlet is disposed atop said upper chamber for effecting a circuitous flowpath from said inlet orifice for separating said powder from said carrier gas.

7. A hopper according to claim 6 further comprising a screen covering said gas outlet for additionally separating said powder from said carrier gas.

8. A hopper according to claim 6 further comprising a screen separating said lower and upper chambers for sifting said powder discharged from said inlet orifice into said lower chamber.

9. A hopper according to claim 6 further comprising a vibrator attached to said housing for promoting said discharge of said powder through said powder outlet.

* * * * *